United States Patent

Rondeau

[11] Patent Number: 5,822,483
[45] Date of Patent: Oct. 13, 1998

[54] DOUBLE IMPACT MOUNTED FERRULE FOR FIBEROPTIC CONNECTOR

[75] Inventor: Michel Y. Rondeau, San Jose, Calif.

[73] Assignee: Fibotech, Inc., Reno, Nev.

[21] Appl. No.: 647,208

[22] Filed: May 8, 1996

Related U.S. Application Data

[63] Continuation of Ser. No. 289,945, Aug. 12, 1994, abandoned.

[51] Int. Cl.⁶ .................................................. G02B 6/36
[52] U.S. Cl. ............................... 385/84; 385/53; 385/81; 385/92
[58] Field of Search ................... 385/84, 86, 66, 385/81, 53, 92, 78

[56] References Cited

U.S. PATENT DOCUMENTS

| | | | |
|---|---|---|---|
| 4,023,886 | 5/1977 | Nakayama et al. | 350/96 C |
| 4,076,379 | 2/1978 | Chouinard | 350/96.22 |
| 4,140,366 | 2/1979 | Makuch et al. | 350/96.22 |
| 4,140,367 | 2/1979 | Makuch et al. | 350/96.22 |
| 4,162,119 | 7/1979 | Goodman | 350/96.21 |
| 4,173,389 | 11/1979 | Curtis | 350/96.2 |
| 4,178,068 | 12/1979 | Hoover | 350/96.21 |
| 4,193,665 | 3/1980 | Arnold | 350/96.22 |
| 4,205,897 | 6/1980 | Stankos | 350/96.21 |
| 4,208,093 | 6/1980 | Borsuk | 350/96.2 |
| 4,218,113 | 8/1980 | Uberbacher | 350/96.21 |
| 4,260,382 | 4/1981 | Thomson | 433/126 |
| 4,300,815 | 11/1981 | Malsot et al. | 350/96.2 |
| 4,310,218 | 1/1982 | Karol | 350/96.21 |
| 4,370,022 | 1/1983 | Johnson | 350/96.21 |
| 4,470,047 | 9/1984 | Abe et al. | 385/84 |
| 4,470,660 | 9/1984 | Hillegonds et al. | 350/96.21 |
| 4,678,264 | 7/1987 | Bowen et al. | 350/96.2 |
| 4,687,292 | 8/1987 | Krausse | 350/96.21 |
| 4,693,550 | 9/1987 | Brown et al. | 385/81 |
| 4,750,803 | 6/1988 | Schmidt | 385/72 |
| 4,752,111 | 6/1988 | Fisher | 350/96.21 |
| 4,767,181 | 8/1988 | McEowen | 350/96.21 |
| 4,785,130 | 11/1988 | Lynch et al. | 174/70 |
| 4,787,706 | 11/1988 | Cannon, Jr. et al. | 350/96.2 |
| 4,869,571 | 9/1989 | Hubner et al. | 350/96.2 |
| 4,946,238 | 8/1990 | Dautartas et al. | 350/96.2 |
| 4,979,793 | 12/1990 | Bowen et al. | 350/96.2 |
| 5,042,900 | 8/1991 | Parker | 385/76 |
| 5,113,464 | 5/1992 | Wall | 385/81 |
| 5,140,662 | 8/1992 | Kumar | 385/87 |
| 5,216,735 | 6/1993 | Rondeau | 385/78 |
| 5,275,596 | 1/1994 | Long et al. | 606/28 |
| 5,276,752 | 1/1994 | Gugelmeyer et al. | 385/69 |
| 5,282,258 | 1/1994 | Hoshino | 385/70 |
| 5,305,406 | 4/1994 | Rondeau | 385/81 |

FOREIGN PATENT DOCUMENTS

| | | |
|---|---|---|
| 0 014 610 | 8/1980 | European Pat. Off. |
| 3308679 A1 | 9/1984 | Germany. |
| 53-6047 | 1/1978 | Japan. |
| 57-34514 | 2/1982 | Japan. |
| 63-250614 | 10/1988 | Japan. |

*Primary Examiner*—Phan T. H. Palmer
*Attorney, Agent, or Firm*—Robert O. Guillot

[57] ABSTRACT

The present invention comprises a malleable ferrule or connector that is impact mounted to an optical fiber at both its forward end and its rearward end. The mounting is accomplished utilizing an impact driver device and a shaped rearward stationary anvil. A tubular ferrule is placed upon an optical fiber and positioned within a mounting device such that the rearward end of the ferrule butts against the stationary rear anvil. An impact driver is then pressed against the forward end of the ferrule to deliver a mechanical impact that simultaneously deforms both the forward end and the rearward end of the ferrule to simultaneously mechanically deform both ends of the ferrule. The ferrule is thereupon mechanically engaged to the optical fiber at both ends, and the excess fiber projecting from the front end is then removed.

9 Claims, 2 Drawing Sheets

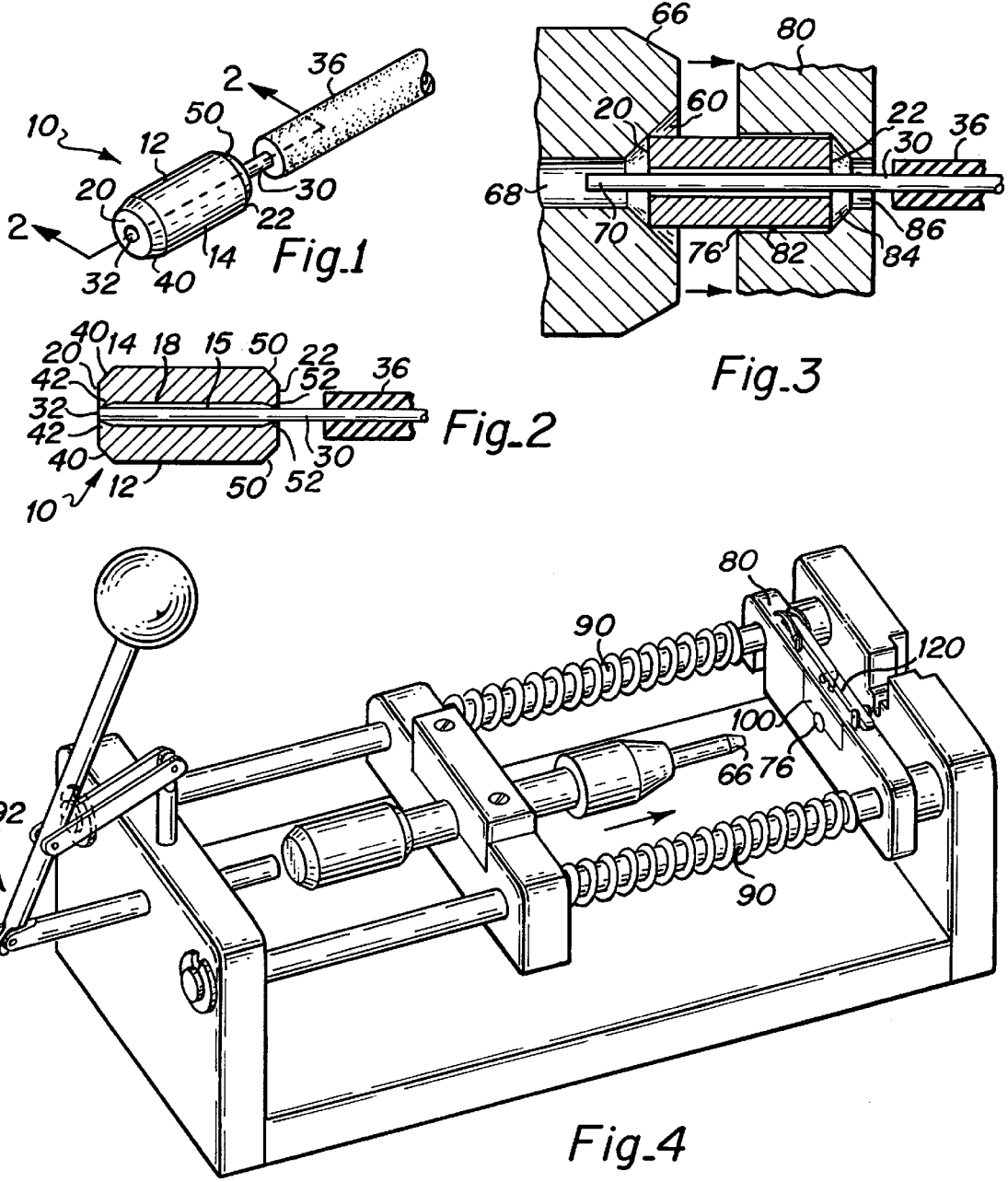

DOUBLE IMPACT MOUNTED FERRULE FOR FIBEROPTIC CONNECTOR

This application is a continuation of application Ser. No. 08/289,945 filed on Aug. 12, 1994 now abandoned.

BACKGROUND OF THE INVENTION

1. Field of the Invention

The present invention relates generally to optical fiber connectors, and more specifically to a malleable ferrule that is engaged to an optical fiber utilizing a mechanical impact device.

2. Description of the Prior Art

The engagement of a ferrule, or a connector having a malleable body to an optical fiber utilizing an impact device is taught in my prior U.S. Pat. No. 5,305,406. That patent teaches the impact mounting of the front end of a malleable ferrule or connector and the crimping of the rearward end. For ferrules having a short cylindrical length, however, the crimping of the rearward end is difficult and generally not feasible, and the utilization of epoxy adhesives is also difficult. The present invention achieves the impact deformation of both ends of the ferrule to achieve a fully mechanical engagement of both ends of the ferrule to an optical fiber.

SUMMARY OF THE INVENTION

It is an object of the present invention to provide an improved method for the engagement of a ferrule to an optical fiber.

It is another object of the present invention to provide an improved ferrule in engagement with an optical fiber.

It is a further object of the present invention to provide for the engagement of a small ferrule to an optical fiber utilizing solely mechanical engagement of the ferrule to the fiber.

It is yet another object of the present invention to provide a ferrule that is impact mounted at both ends to an optical fiber.

It is yet a further object of the present invention to provide a method for impact mounting both ends of a ferrule to an optical fiber in a single impact step.

The present invention comprises a malleable ferrule or connector that is impact mounted to an optical fiber at both its forward end and its rearward end. The mounting is accomplished utilizing an impact driver device and a shaped rearward stationary anvil. A tubular ferrule is placed upon an optical fiber and positioned within a mounting device such that the rearward end of the ferrule butts against the stationary rear anvil. An impact driver is then pressed against the forward end of the ferrule to deliver a mechanical impact that simultaneously deforms both the forward end and the rearward end of the ferrule to simultaneously mechanically deform both ends of the ferrule. The ferrule is thereupon mechanically engaged to the optical fiber at both ends, and the excess fiber projecting from the front end is then removed.

It is an advantage of the present invention that it provides an improved method for the engagement of a ferrule to an optical fiber.

It is another advantage of the present invention that it provides an improved ferrule end engagement with an optical fiber.

It is a further advantage of the present invention that it provides for the engagement of a small ferrule to an optical fiber utilizing solely mechanical engagement of the ferrule to the fiber.

It is yet another advantage of the present invention that it provides a ferrule that is impact mounted at both ends to an optical fiber.

It is yet a further advantage of the present invention that it provides a method for impact mounting both ends of a ferrule to an optical fiber in a single impact step.

The objects, features and advantages of the present invention will become apparent to one skilled in the art upon review of the following detailed description of the invention.

IN THE DRAWINGS

FIG. 1 is a perspective view of a ferrule of the present invention mounted upon an optical fiber;

FIG. 2 is a cross-sectional view of the ferrule and optical fiber depicted in FIG. 1, taken along lines 2—2 of FIG. 1;

FIG. 3 is a cross-sectional view schematically depicting the method for manufacturing the present invention depicted in FIGS. 1 and 2;

FIG. 4 depicts a device that is utilized to practice the method of engagement of a ferrule to an optical fiber;

DETAILED DESCRIPTION OF THE PREFERRED EMBODIMENTS

Figure 5:
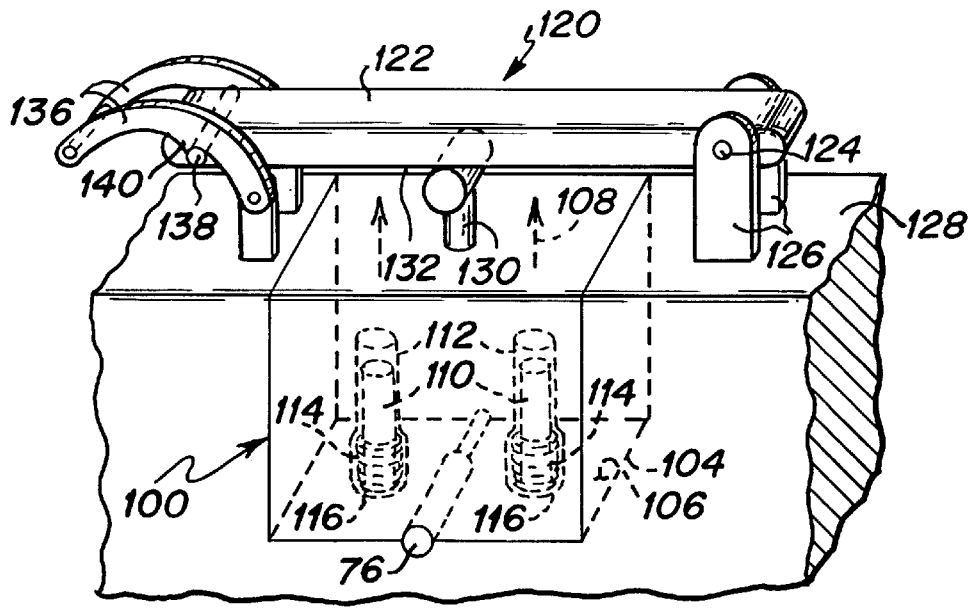
FIG. 5 depicts the rearward stationary anvil of the device depicted in FIG. 4.

FIG. 1 depicts the mounted ferrule of the present invention, and FIG. 2 is a cross-sectional view of FIG. 1, taken along lines 2—2 of FIG. 1. As depicted in FIGS. 1 and 2, the mounted ferrule 10 of the first preferred embodiment of the present invention comprises a cylindrical tubular member 12 having an outer surface 14 and an inner bore 16 defined by the inner walls 18. The ferrule 12 has a forward end 20 and a rearward end 22 of the cylindrical member.

The ferrule 12 is mounted upon the end of an optical fiber 30 such that the distal terminal end 32 of the optical fiber 30 is coterminous with the forward end 20 of the ferrule 12. In preferred embodiment 10, the ferrule 12 is mounted upon the optical fiber 30; thus, the optical fiber buffer 36 is shown stripped away from the end of the optical fiber 30, whereby the ferrule 12 is mounted at both its forward end and rearward end upon the optical fiber 30 and not upon the buffer 36. Another embodiment of the invention, described with reference to FIGS. 6 and 7 herebelow, teaches a ferrule that is mounted upon the optical fiber buffer 36 at its rearward end.

As is best seen in FIG. 2, the forward end 20 of the ferrule 12 is mechanically mounted to the optical fiber 30 by the mechanical deformation 40 of the frontward edge of the ferrule 12. The mechanical deformation 40 causes the inner surface 18 of the forward end portion of the bore 16 to collapse inwardly 42 to make a firm mechanical, frictional contact with the outer surface of the optical fiber 30. In a like manner, the rearward end 22 of the ferrule 12 is mechanically deformed 50 at the rearward edge, thus causing the inner surface 18 at the rearward end of the bore 16 to collapse inwardly 52 to produce a mechanical, frictional engagement with the outer surface of the optical fiber 30. It is therefore to be understood that the ferrule 12 is mechanically, frictionally engaged to the optical fiber 30 at both its forward end 20 and rearward end 22 by the mechanical deformation of the forward edge 40 and rearward edge 50 of the ferrule 12.

It is necessary that the ends 20 and 22 of the ferrule 12 be composed of a malleable material in order for the edges 40 and 50 to be deformed to create the inwardly collapsed portions 42 and 52 respectively. In the preferred embodiment, the ferrule 12 is composed of a malleable metal, such as copper, brass or aluminum; however, almost any malleable material would be a suitable candidate for the ferrule 12.

A preferred method for manufacturing the assembled ferrule and optical fiber 10 is schematically depicted as a cross-sectional view in FIG. 3. As depicted therein, the ferrule 12 is mounted upon an optical fiber 30. The forward end 20 of the ferrule 12 is disposed within a cone-shaped bore 60 that is formed in the nose 62 of an impact driver 66. A central bore 68 is formed within the nose 66 to permit a forwardly projecting portion 70 of the optical fiber 30 to reside therein. The utilization of such an impact driver device for the mechanical deformation of the forward end of a ferrule is taught in my U.S. Pat. No. 5,305,406, the teachings of which are incorporated herein as though set forth in full.

A rearward portion of the ferrule 12 is disposed within a bore 76 formed within a stationary block or anvil 80. The bore 76 includes a first cylindrical portion 82 which terminates in an inwardly projecting cone shaped portion 84, followed by a second cylindrical bore portion 86 having a smaller diameter than the bore section 82. As can be understood from FIG. 3, the larger cylindrical bore section 82 serves to hold and align the ferrule 12 disposed therewithin and the smaller diameter cylindrical bore section 86 serves to facilitate the passage of the optical fiber 30 therethrough. The cone shaped bore portion 84 serves to mechanically deform the rearward end 22 of the ferrule 12 when the impact driver 66 mechanically strikes the forward end 20 of the ferrule 12 to mechanically deform the forward end of the ferrule 12. The cone shaped cavities thus provide radially uniform, symmetrical deformations 40 and 50 of the front and rear ends 20 and 26 respectively of the ferrule.

The preferred method for manufacturing the device 10 involves the steps of placing the ferrule 12 upon the optical fiber 30 and inserting the fiber and ferrule 12 into the bore 76, such that the rearward end 22 of the ferrule 12 makes contact with the cone shaped bore section 84. Thereafter, the impact driver 66 is brought into contact with the forward end 20 of the ferrule 12. Next, sufficient force is applied to the impact driver 66 to cause it to apply its mechanical impact force to the forward end 20 of the ferrule 12. The impact force upon the forward end 20 drives the rearward end 22 into the cone shaped cavity 84 while the front end 20 is simultaneously driven into the cone shaped cavity 60 of the impact driver. Thus, both the frontward end 20 and the rearward end 22 of the ferrule 12 are simultaneously deformed by a single impact from the impact driver 66. After the impact driver has been utilized, the deformed forward 40 and rearward 50 edges of the ferrule 12 appear as depicted in FIGS. 1 and 2, and the ferrule 12 is then mechanically, frictionally engaged to the optical fiber 30. Lastly, the optical fiber and mounted ferrule are removed from the stationary block 80 and the protruding forward end 70 of the optical fiber 30 is cleaved to produce the flush optical fiber end 32 depicted in FIGS. 1 and 2.

Detailed depictions of a device suitable for practicing the assembly method described above are presented in FIGS. 4 and 5, wherein FIG. 4 depicts the assembly device taught in my U.S. Pat. No. 5,307,406 having a new, modified holding block 80, and FIG. 5 provides a detailed depiction of the modified holding block 80. Briefly, as depicted in FIG. 4 and described in detail in my U.S. Pat. No. 5,307,406, the teachings of which are incorporated herein, an impact driver 66 is movably mounted upon two rails 90 to be slidably propelled towards the mounting block 80 through the user's manipulation of the lever arm mechanism 92. A ferrule mounting hole 76 is formed through the mounting block 80.

The new mounting block 80 includes a generally rectangular upwardly movable insert block 100. As is best seen in FIG. 5, the lower surface 104 of the block 100 bisects the bore 76 in the axial direction such that a lower half of the bore 76 is formed in the notch surface 106 in the block 80, and an upper half of the bore 76 is formed in the lower surface 104 of the insert block 100. The block 100 is upwardly movable 108 in its engagement within the anvil block 80. To facilitate the aligned upward and downward movement of the block 100, two vertically extending alignment pins 110 project from the notch surface 106 of the anvil block 80 into alignment bores 112 formed in the block 100. To urge the upward movement of the block 100, a coil spring 114 is disposed around the base of each alignment pin 110, and an enlarged coil spring bore 116 is formed in the lower portion of the alignment pin bores 112.

To accomplish the upward and downward movement of the block 100, a clamp-lever mechanism 120 is provided. The mechanism 120 includes a lever arm 122 that is pivotable about a pivot pin 124 that is engaged to a bracket 126 which is joined to the upper surface 128 of the anvil block 80. A block depression T-shaped pin 130 projects from the block 100 into a sliding engagement with the lower surface 132 of the lever arm 122. A curved lever arm clamp 136 is engaged to the upper surface of the anvil block 80 on the opposite side of the block 100 from the bracket 126 to hold the lever arm 122 in a fixed, downward position by the interaction of an outwardly projecting pin 138 from the lever arm 122 and a curved projection 140 of the clamp 136. It is therefore to be understood that the disengagement of the lever arm pin 138 from the clamp 136 will permit the upward motion of the lever arm 122, thus causing the movable block 100 to be lifted upward along the alignment pins 110.

As will be understood by those skilled in the art, the opening movement of the movable block 100 is necessary to facilitate the removal of the assembled ferrule and optical fiber from the anvil block 80. Specifically, as will be understood with the aid of FIG. 3, the optical fiber 30 can be inserted into the narrow bore 86 through the anvil block 80. Thereafter, an unimpacted ferrule 12 can be inserted upon the projecting end 70 of the optical fiber 30, and still thereafter the impact driver 66 can be utilized to deform the two ferrule ends to mechanically engage the ferrule 12 to the optical fiber 30. Then, however, it becomes impossible to remove the optical fiber with its engaged ferrule back through the anvil block 80. For this reason, the movable block portion 100 of the anvil block 80 must be opened, or in this embodiment lifted upwardly a sufficient distance to permit the removal of the optical fiber with its engaged ferrule 12 backwardly through the enlarged opening created by the upward movement of the movable block 100.

It will no doubt be appreciated by those skilled in the art that many different devices and mechanisms can be created which facilitate the double impacting of the forward end and rearward end of a ferrule upon an optical fiber. It will likewise be understood by those skilled in the art that devices which simultaneously impact both ends of a ferrule can be created which differ significantly in their operational characteristics from those depicted in FIGS. 3, 4 and 5. And it will similarly be understood by those skilled in the art that different devices and methods can be created for the assembly, holding and removal of the assembled ferrule and optical fiber from a manufacturing device. All such altered and amended devices which accomplish the mechanical deformation of the forward and rearward ends of a ferrule upon an optical fiber to mechanically engage the ferrule to the fiber are within the scope of the invention described herein.

Figure 6:
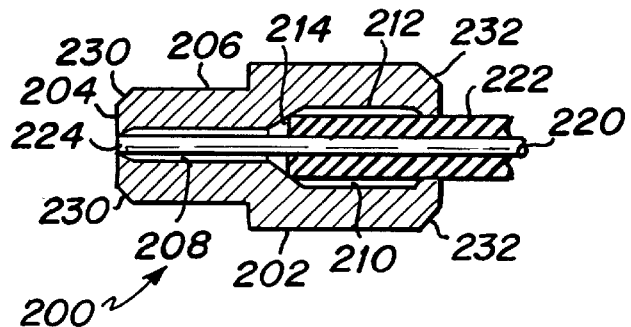
FIG. 6 depicts an alternative ferrule design that is engaged to optical fiber utilizing the method of the present invention.

An alternative embodiment of a ferrule assembly of the present invention is depicted in FIG. 6. As depicted therein, the ferrule 200 includes a cylindrical body portion 202 having a forward end 204 and a rearward end 205. A forwardly projecting nose portion 206 includes an optical fiber bore 208 that is centrally disposed therethrough. A central cavity 210 is formed through the ferrule 200. The cavity 210 includes an enlarged bore section 212 which starts at the rearward end 205 and terminates at its inward end in an inwardly depending conical section 214 which terminates at its apex in the inner end of the optical fiber bore 208. A sheathed optical fiber 220 is disposed within the ferrule 200 such that the optical fiber buffer 222 projects into the enlarged bore portion 212 and the optical fiber 224 projects through the cone section 214 and through the optical fiber bore 208.

The outer edges of the forward end 204 are mechanically deformed 230 such that the frontward end of the optical fiber 224 is mechanically frictionally held within the nose 206 of the ferrule 200. The outer edge of the rearward end 205 is likewise deformed 232 to mechanically frictionally engage the surface of the buffer 222. Thus, the sheathed optical fiber 220 is mechanically, frictionally engaged within the ferrule 200 by the mechanical deformation of the forward end 204 and rearward end 205 of the ferrule 200.

Figure 7:
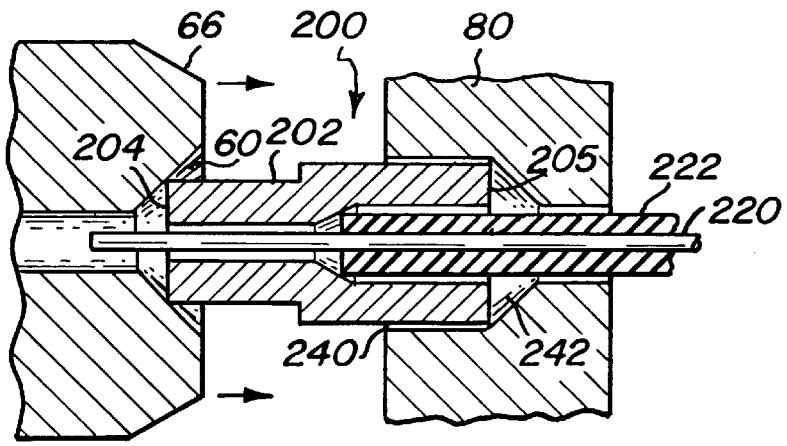
FIG. 7 is a cross-sectional view schematically depicting the method for manufacturing the embodiment depicted in FIG. 6.

The method for assembling the ferrule 200 and sheathed optical fiber 220 is accomplished utilizing a modified mounting block of the present invention. Specifically, as depicted in FIG. 7, which is similar in many respects to FIG. 3, the ferrule 200 is placed upon the optical fiber 220 and placed within an enlarged cavity 240 formed within an anvil block 80. By way of comparison with FIG. 3, it is seen that the cavity 240 of FIG. 7 is larger than cavity 76 of FIG. 3, such that the optical fiber with its included buffer and the ferrule 200 of enlarged diameter which surrounds the buffer 222 all reside within a cavity 240 of appropriate size. The forward end 204 resides within the cone shaped cavity 60 of an impact driver 66, and the rearward end 205 is engaged within a cone shaped cavity 242 formed within the block 80. Thereafter, a suitable force is applied to the impact driver to cause its movement towards the block 80, thus causing the forward end 204 and rearward end 205 to be driven into the cone shaped cavities 60 and 242, respectively. The force of the impact driver thus causes the simultaneous deformations 230 and 232 of the forward end 204 and rearward end 205, respectively, of the ferrule 200, thus engaging the ferrule to the optical fiber. As indicated hereinabove, the cone shaped cavities create a radially uniform, symmetrical deformation of the forward and rearward ends of the connector 200.

While the present invention has been shown and described with reference to certain preferred embodiments, it will be understood by those skilled in the art that certain alterations and modifications in form and detail may be made therein while retaining the inventive heart of my invention. Whereby it is my intention to claim all such alterations and modifications as fall within the true spirit and scope of the invention.

What I claim is:

1. An optical fiber connector assembly comprising:

a connector member having a first end including a first end face and a second end including a second end face and an optical fiber bore formed therethrough from said first end to said second end; said first end face and said second end face being generally perpendicular to said optical fiber bore;

an optical fiber having an end portion; said optical fiber being disposed within said optical fiber bore such that said end portion of said optical fiber is disposed proximate said first end of said connector member;

said connector member having a first mechanically deformable portion disposed at said first end and including said first end face and a second mechanically deformable portion disposed at said second end and including said second end face;

said first mechanically deformable portion being deformed adjacent to said optical fiber end such that said first end face is deformed and segments of said first deformable portion are frictionally engaged to said optical fiber to hold said optical fiber within said connector member; and said second mechanically deformable portion being deformed at said second end adjacent said optical fiber such that said second end face is deformed and segments of said second deformable portion are frictionally engaged to said optical fiber to hold said optical fiber within said connector member.

2. An optical fiber connector assembly as described in claim 1 wherein said optical fiber further includes an optical fiber buffer portion and said buffer portion is disposed within said optical fiber bore from said second end into said connector member; and said second mechanically deformable portion is deformed adjacent said optical fiber buffer, such that segments of said second deformable portion are frictionally engaged to said buffer portion to hold said buffer portion within said connector member.

3. An optical fiber connector assembly as described in claim 1 wherein said first mechanically deformable portion is deformed in a radially symmetrical manner, and said second mechanically deformable portion is deformed in a radially symmetrical manner.

4. A method for manufacturing a fiberoptic connector assembly comprising the steps of:

placing a connector member upon an end of an optical fiber; said connector member having a first end including a first end face and a second end including a second end face and an optical fiber bore formed within said connector member between said first end and said second end; said first end face and said second end face being generally perpendicular to said optical fiber bore; such that said optical fiber projects through said optical fiber bore from said second end to said first end;

mechanically deforming said first end around said optical fiber such that said first end face is deformed, and such that said optical fiber is mechanically, frictionally engaged within said optical fiber bore;

mechanically deforming said second end around said optical fiber such that said second end face is deformed, and such that said optical fiber is mechanically frictionally engaged within said optical fiber bore.

5. A method for manufacturing a fiberoptic connector assembly as described in claim 4 wherein said first end is radially, symmetrically deformed by said step of mechanically deforming said first end, and wherein said second end is radially, symmetrically deformed by said step of mechanically deforming said second end.

6. A method for manufacturing a fiberoptic connector assembly as described in claim 4 wherein said steps of mechanically deforming said first end and mechanically deforming said second end are performed simultaneously.

7. A method for manufacturing a fiberoptic connector assembly as described in claim 4 wherein said steps of mechanically deforming said first end and mechanically deforming said second end are accomplished by a single mechanical deformation force.

8. A method for manufacturing a fiberoptic connector assembly as described in claim 4, wherein said optical fiber includes an optical fiber buffer portion that is disposed within said connector member from said second end thereof, and wherein said second end is mechanically deformed such that said buffer portion is mechanically, frictionally engaged within said connector member.

9. A method for manufacturing a fiberoptic connector assembly as described in claim 4 wherein said optical fiber bore is generally cylindrical having a longitudinal axis therethrough, and said steps of mechanically deforming said first end and mechanically deforming said second end are accomplished by the step of applying a deformation causing device to said connector member in a direction that is parallel to said longitudinal axis of said optical fiber bore.

* * * * *